United States Patent [19]

Stine et al.

[11] Patent Number: 5,679,096
[45] Date of Patent: Oct. 21, 1997

[54] TORQUE CONTROL FOR POWERTRAIN AND CHANGE-GEAR TRANSMISSION UTILIZED IN SAME

[75] Inventors: Alan C. Stine, Kalamazoo; Brian P. Coe, Portage, both of Mich.

[73] Assignee: Eaton Corporation, Cleveland, Ohio

[21] Appl. No.: 628,061

[22] Filed: Apr. 8, 1996

[51] Int. Cl.$^6$ .............................. F16H 3/02; B60K 41/08
[52] U.S. Cl. .................... 477/111; 74/745; 74/325
[58] Field of Search .................. 74/325, 745; 477/107, 477/111

[56] References Cited

U.S. PATENT DOCUMENTS

| | | | |
|---|---|---|---|
| 4,722,248 | 2/1988 | Braun | 74/745 |
| 4,754,665 | 7/1988 | Vandervoort | 74/745 |
| 4,944,197 | 7/1990 | Stine et al. | 74/477 |
| 5,038,627 | 8/1991 | Schwaiger et al. | 74/335 |
| 5,048,372 | 9/1991 | Sodeno et al. | 477/111 |
| 5,305,213 | 4/1994 | Boardman et al. | 364/424.1 |
| 5,363,715 | 11/1994 | Huggins et al. | 744/743 |
| 5,385,066 | 1/1995 | Braun | 74/331 |
| 5,409,432 | 4/1995 | Steeby | 477/71 |
| 5,487,005 | 1/1996 | Genise | 364/424.1 |

*Primary Examiner*—Dirk Wright
*Attorney, Agent, or Firm*—Howard D. Gordon

[57] ABSTRACT

An improved transmission (10) having enhanced torque capacity gearings for only the upper ratios (15th, 16th) and a powertrain system (100) utilizing same are provided. The powertrain system includes a torque-controlled engine (E) and a controller (208), preferably defined by the engine controller (EC), for limiting transmission input torque in the lower ratios.

18 Claims, 6 Drawing Sheets

| Ratio No. | Main section gear engaged to mainshaft | Gear engaged by Clutch 126 | Gear engaged by Clutch 128 | Ratio |
|---|---|---|---|---|
| LoLo | 56 | 120 | 124 | 15.17 |
| Lo | 56 | 118 | 124 | 13.08 |
| 1 | 54 | 120 | 124 | 8.26 |
| 2 | 54 | 118 | 124 | 7.07 |
| 3 | 52 | 120 | 124 | 6.12 |
| 4 | 52 | 118 | 124 | 5.25 |
| 5 | 50 | 120 | 124 | 4.54 |
| 6 | 50 | 118 | 124 | 3.88 |
| 7 | 24 | 120 | 124 | 3.36 |
| 8 | 24 | 118 | 124 | 2.84 |
| 9 | 54 | 120 | 120 | 2.46 |
| 10 | 54 | 118 | 120 | 2.10 |
| 11 | 52 | 120 | 120 | 1.82 |
| 12 | 52 | 118 | 120 | 1.56 |
| 13 | 50 | 120 | 120 | 1.35 |
| 14 | 50 | 118 | 120 | 1.16 |
| 15 | 24 | 120 | 120 | 1.00 |
| 16 | 24 | 118 | 120 | 0.86 |
| $R_{Lo}$ | 58 | 120 | 124 | |
| $R_H$ | 58 | 120 | 120 | |

TORQUE CONTROL FOR POWERTRAIN AND CHANGE-GEAR TRANSMISSION UTILIZED IN SAME

BACKGROUND OF THE INVENTION

This application is related to co-pending U.S. Ser. No. 08/560,458 filed Nov. 17, 1995, entitled POWER TRAIN TORQUE CONTROL and assigned to EATON CORPORATION, the assignee of this application.

1. Field of the Invention

The present invention relates to a system/method for controlling the engine output torque (i.e., flywheel torque) in a vehicle powertrain including a torque-controlled engine and a change-gear transmission such as an overdrive-type change-gear transmission and the change-gear transmission utilized in same. In particular, the present invention relates to a powertrain system including a torque-controlled engine, an overdrive-type transmission having a direct and at least one overdrive ratio and having enhanced torque capacity overdrive gears or a direct-drive-type transmission wherein the ratio adjacent the direct drive ratio has enhanced torque capacity gears and a controller for sensing the currently engaged gear ratio and issuing command output signals for limiting engine output torque to a lower value for ratios below direct and the enhanced torque capacity gearing ratios, and to a higher value for direct and the enhanced torque capacity gearing ratios.

2. Description of the Prior Art

Change-gear transmissions for heavy-duty vehicles of the direct drive type and of the overdrive type (i.e., at least one gear ratio wherein the ratio of input shaft rotational speed to output shaft rotational speed is less than 1:1 are well known in the prior art, as may be seen by reference to U.S. Pat. Nos. 3,105,395; 3,799,002; 4,754,665 and 4,944,197, the disclosures of which are incorporated herein by reference.

Internal combustion engines having a controlled or controllable output torque also are well known. Such engines may be electronically controlled, have a dedicated microprocessor-based engine controller and/or communicate over an onboard data link conforming to an industry standard protocol such as SAE J-1922, SAE J-1939 and/or ISO 11898. Such engines may be seen by reference to U.S. Pat. Nos. 5,393,276 and 5,401,223, the disclosures of which are incorporated herein by reference. Such engines typically have at least one mode of operation wherein output torque is controlled and/or limited to a value less than maximum engine output torque. By way of example, the SAE J-1939 protocol provides for four modes of engine fueling, (1) tracking operator throttle pedal setting, (2) controlling engine speed, (3) controlling engine output torque and (4) limiting engine speed and output torque, It also is known to utilize powertrains including overdrive transmissions and high-peak-torque engines, controlled to utilize less than peak torque to protect the powertrain, especially the transmission, for economy reasons.

Transmissions manually shifted in lower ratios or groups of ratios, and automatically shifted in the upper two ratios, are known in the prior art, as may be seen by reference to U.S. Pat. Nos. 4,722,248; 5,038,627 and 5,435,212, the disclosures of which are incorporated herein by reference.

It also has been recognized that in a powertrain including a transmission having a direct drive ratio, when the transmission is in the direct drive ratio, torque is transferred from input shaft to output shaft without torque transfer across meshing gear teeth or through countershafts and, thus, a greater engine torque may be permitted for extended periods without risk of damage to the transmission. While allowing higher or unlimited engine output torque in direct ratio is advantageous for direct-type transmissions, it is not fully attractive for powertrains having (i) overdrive-type transmissions, as a lesser engine torque would be available in the higher (i.e., overdrive) ratios then in a lower ratio (direct), which would be a disturbing drive characteristic, or (ii) transmissions wherein the upper two ratios are automatically operated.

SUMMARY OF THE INVENTION

According to the present invention, the drawbacks of the prior art are minimized or overcome by the provision of a vehicular powertrain comprising a torque-controlled engine, an overdrive-type or direct-drive-type transmission having a direct drive ratio as one of the top two or three forward ratios and all of the gearing of the non-direct ones of the top two ratios being of enhanced torque capacity, as compared to the lower ratio gearing and a controller for receiving input signals, including signals indicative to engaged gear ratio, and issuing output signals to control engine output torque, said controller allowing said engine to have a greater output torque in the top two or more higher ratios than in lower ratios.

Accordingly, it is an object of the present invention to provide a new and improved vehicular powertrain, including an overdrive-type or a direct-drive-type transmission, allowing higher engine torque in at least the higher two ratios without damage to the powertrain.

This and other objects and advantages of the present invention will become apparent from a reading of the following description of the preferred embodiment taken in connection with the attached drawings.

DESCRIPTION OF THE PREFERRED EMBODIMENT

Certain terminology will be used in the following description for convenience in reference only and will not be limiting. The words "upwardly," "downwardly," "rightwardly" and "leftwardly" will designate directions in the drawings to which reference is made. The words "forward" and "rearward" will refer to the front and rear ends, respectively, of the transmission as conventionally mounted in a vehicle, being respectively from the left and right sides of the transmission illustrated in FIG. 1. The words "inwardly" and "outwardly" will refer to directions toward and away from, respectively, the geometric center of the device and designated parts thereof. Said terminology will include the words above specifically mentioned, derivatives thereof and words of similar import.

The term "compound transmission" is used to designate a change-speed or change-gear transmission having a multiple-forward-speed main transmission section and a multiple-speed auxiliary transmission section connected in series whereby the selected gear reduction in the main transmission section may be compounded by further selected gear reduction in the auxiliary transmission section. The term "upshift" as used herein shall mean the shifting from a lower speed gear ratio to a higher speed gear ratio. The term "downshift" as used herein shall mean the shifting from a higher speed gear ratio to a lower speed gear ratio. The terms "low speed gear" or "low gear" as used herein shall designate a gear ratio utilized for relatively lower forward speed operation in a transmission (I.e., a set of gears having a higher ratio of reduction of output shaft speed relative to the speed of the input shaft).

"Synchronized clutch assembly" and words of similar import shall designate a clutch assembly utilized to non-rotatably couple a selected gear to a shaft by means of a positive clutch in which attempted engagement of said clutch is prevented until the members of the clutch are at substantially synchronous rotation in a relatively large-capacity friction means are utilized with the clutch members and are sufficient, upon initiation of a clutch engagement, to cause the clutch members and all members rotating therewith to rotate at substantially synchronous speed.

Figure 1:
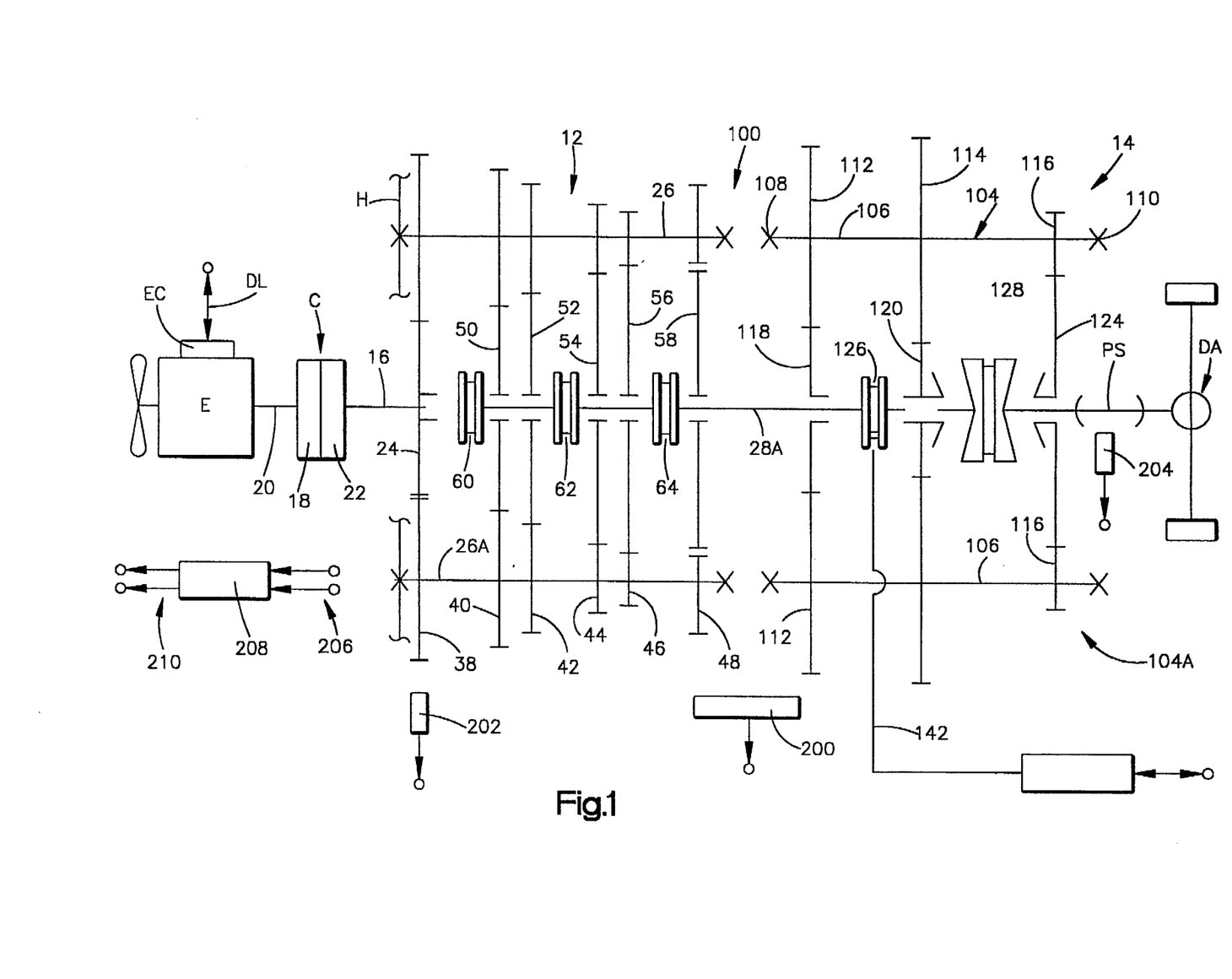
FIG. 1 is a schematic illustration of the vehicular powertrain system of the present invention utilizing an overdrive-type transmission.
Figure 1A:
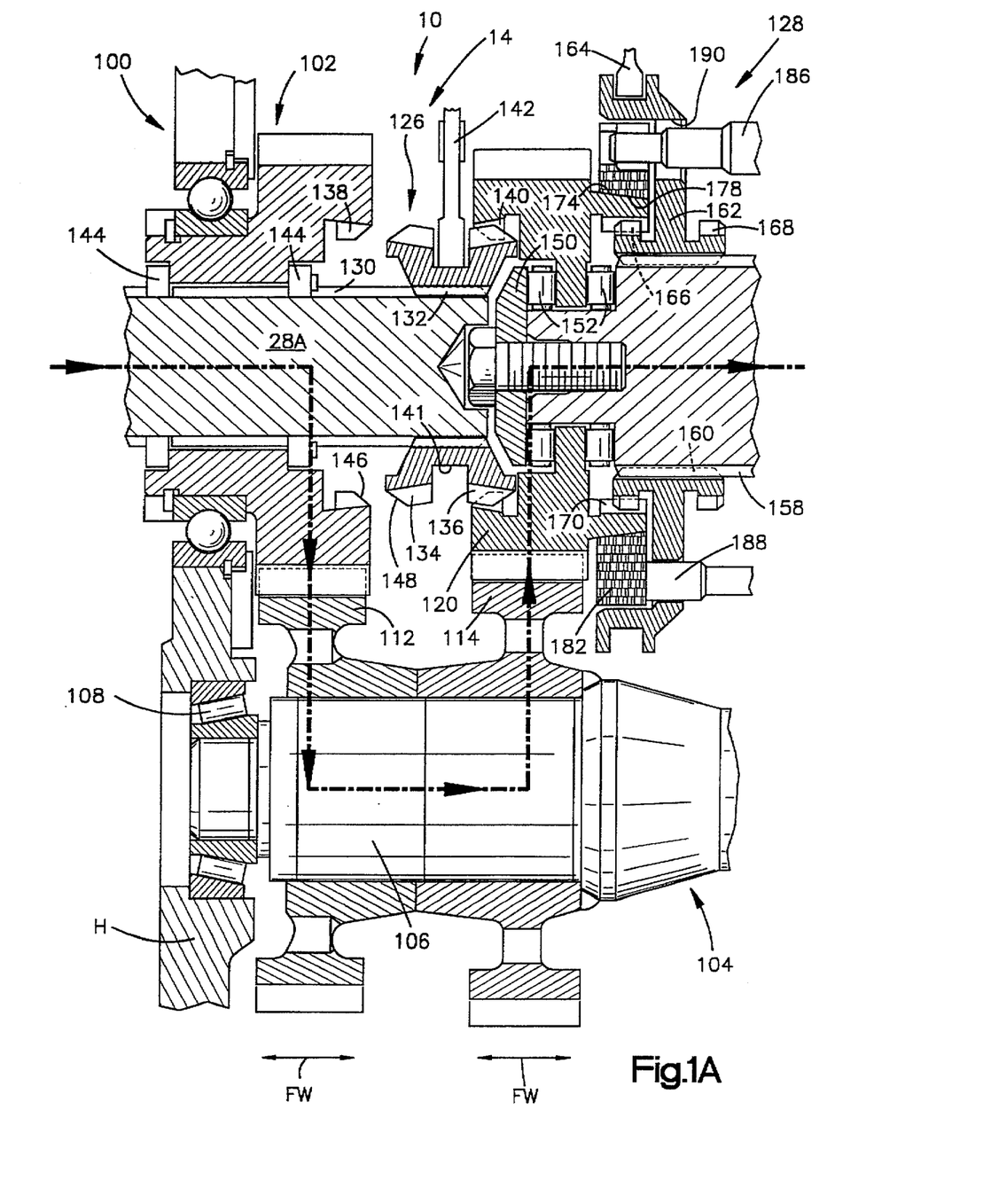
FIGS. 1A and 1B are plan views, in section, of the auxiliary transmission section of the transmission illustrated in FIG. 1.
Figure 1B:
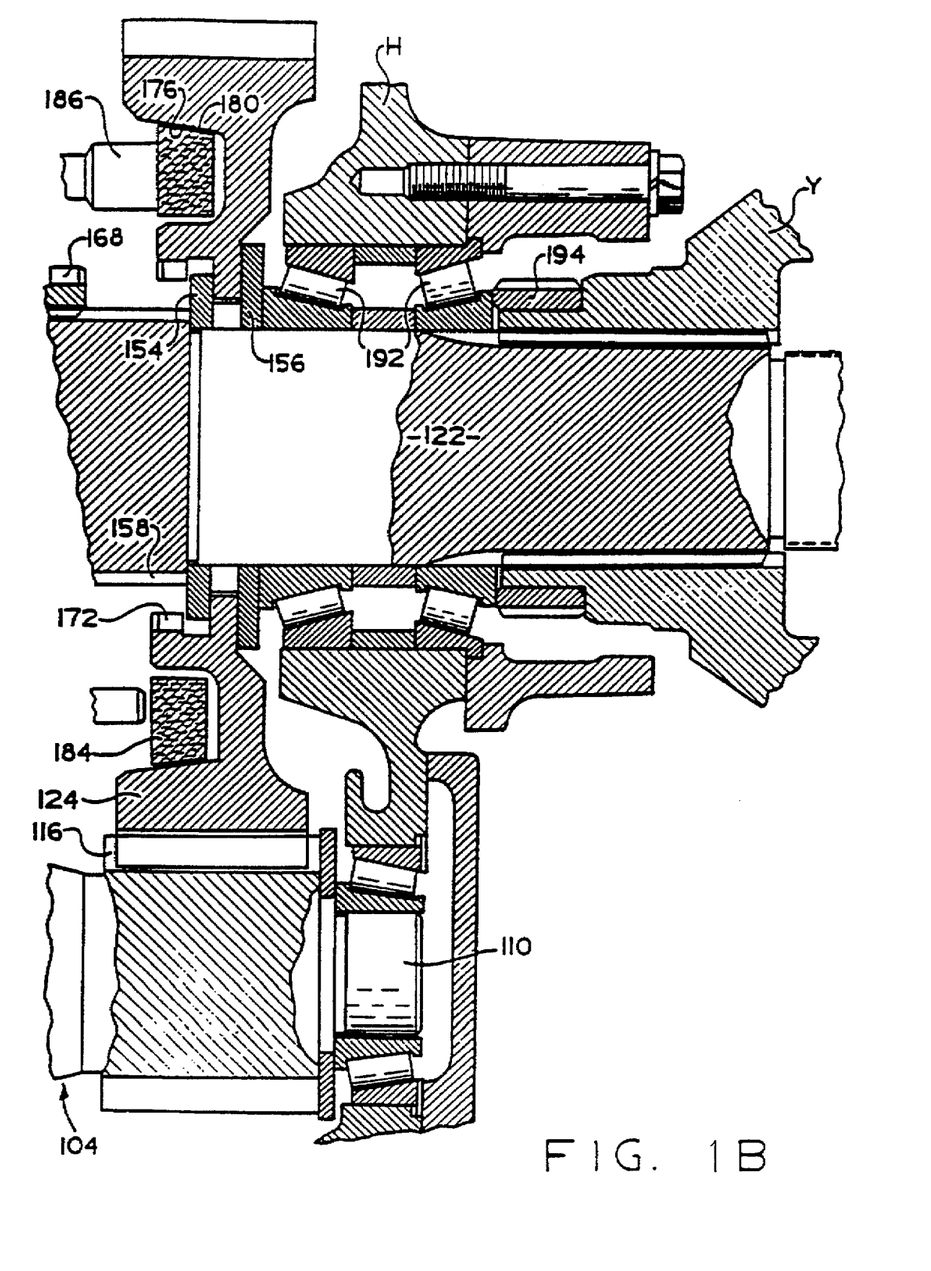

Referring to FIGS. 1, 1A and 1B, there is illustrated a heavy-duty vehicular powertrain system 100 including an 18-forward-speed overdrive-type compound transmission 10 of the type illustrated in aforementioned U.S. Pat. No. 4,754,665. The overdrive-type transmission 10 includes a main transmission section 12 connected in series with a 3-gear-layer, 4-speed combined splitter-and-range-type auxiliary section 14.

Typically, transmission 10 is housed within a single housing and includes an input shaft 16 driven by a prime mover, such as diesel engine E, through a selectively disengaged, normally engaged friction master clutch C having an input or driving section 18 drivingly connected to the engine crank shaft 20 and a driven portion 22 rotatably fixed to the transmission input shaft 16.

The engine E is a torque-controlled engine, preferably an electronically controlled engine having an engine controller EC for communicating with an electronic data link DL of the type utilizing an industry-established protocol such as SAE J-1922, SAE J-1939, ISO 11898 or similar protocol. The engine controller will, in at least one mode of operation, control fueling of the engine to limit engine torque to an input signal set value less than maximum engine torque.

In the main transmission section 12, the input shaft 16 carries an input gear 24 for simultaneously driving a plurality of substantially identical main section countershaft assemblies 26 and 26a at substantially identical rotational speeds. In the transmission 10 illustrated, two substantially identical main section countershaft assemblies are provided on diametrically opposite sides of a mainshaft 28, which mainshaft is generally coaxially aligned with the input shaft 16. Each of the main section countershaft assemblies 26 and 26a comprises a main section countershaft 30 supported by bearings 32 and 34 in housing H, only a portion of which is schematically illustrated. Each of the main section countershafts 30 is provided with an identical grouping of main section countershaft gears 38, 40, 42, 44, 46 and 48, fixed for rotation therewith. A plurality of main section drive or mainshaft gears 50, 52, 54, 56 and 58 surround the mainshaft 28 and are selectively clutchable, one at a time, to the mainshaft 28 for rotation therewith by sliding clutch collars 60, 62 and 64, as is well known in the art. Clutch collar 60 also may be utilized to clutch input gear 24 to mainshaft 28 to provide a direct drive relationship between input shaft 16 and mainshaft 28. Preferably, each of the main section mainshaft gears encircles the mainshaft 28 and is in continuous meshing engagement with and is floatingly supported by the associated countershaft gear group, which mounting means and a special advantages resulting therefrom are explained in greater detail in U.S. Pat. Nos. 3,105,395 and 3,335,616, the disclosures of which are incorporated herein by reference. Typically, clutch collars 60, 62 and 64 are axially positioned by means of shift forks (not illustrated) associated with a shift bar housing assembly (not illustrated), as is well known in the prior art. Clutch collars 60, 62 and 64 are of the well-known non-synchronized double-acting jaw clutch type.

It is understood that although the present invention is illustrated as utilizing transmissions of the well-known and commercially successful multiple identical countershaft, floating mainshaft and floating mainshaft gear type, and while the auxiliary transmission section of the present invention is particularly well suited for such transmission structure, the advantages of the present invention are equally applicable to transmissions of the single countershaft or non-identical multiple countershaft type.

Main section mainshaft gear 52 is the reverse gear and is in continuous meshing engagement with countershaft gears 48 by means of conventional intermediate idler gears (not shown). It should also be noted that while main transmission section 12 does provide five selectable forward speed ratios, the lowest forward speed ratio, namely, that ratio provided by drivingly connected mainshaft drive gear 56 to mainshaft 28, is often of such a high gear reduction as to be considered a low or "creeper" gear, which is utilized only for starting of a vehicle under severe conditions and is usually not utilized in the high transmission range and/or may not be split in the low transmission range. Accordingly, while the main section 12 illustrated does provide five forward speeds, it is usually referred to as a "4+1" main section, as only four of the forward speeds are compounded by the auxiliary transmission section 102.

Jaw clutches 60, 62 and 64 are 3-position clutches in that they may be positioned in a centered, non-engaged position as illustrated or in a fully rightwardly engaged or fully leftwardly engaged position.

Auxiliary transmission section 14 includes two substantially identical auxiliary countershaft assemblies 104 and 104A, each comprising an auxiliary countershaft 106 supported by bearings 108 and 110 in housing H and carrying three auxiliary section countershaft gears 112, 114 and 116 fixed for rotation therewith. Auxiliary countershaft gears 112 are constantly meshed with and support auxiliary section splitter gear 118 which surrounds mainshaft 28A. Auxiliary countershaft gears 114 are constantly meshed with and support auxiliary section splitter/range gear 120 which surrounds the output shaft 122 at the end thereof adjacent the coaxial end of mainshaft 28A. Auxiliary section countershaft gears 116 constantly mesh and support auxiliary section range gear 124, which surrounds the output shaft 122. Accordingly, auxiliary section countershaft gears 112 and splitter gear 118 define a first gear layer, auxiliary section countershaft gears 114 and splitter/range gear 120 define a second gear layer and auxiliary section countershaft gears 116 and range gear 124 define a third layer, or gear group of the combined splitter-and-range-type auxiliary transmission section 102.

A sliding 2-position jaw clutch collar 126 is utilized to selectively couple either the splitter gear 118 or the splitter/range gear 120 to the mainshaft 28A, while a two position synchronized assembly 128 is utilized to selectively couple the splitter/range gear 120 or the range gear 124 to the output shaft 122. The structure and function of double acting sliding jaw clutch collar 126 is substantially identical to the structure and function of sliding clutch collar 96 utilized in connection with transmission 10 while the structure and function of double acting synchronized clutch assembly 128 is substantially identical to the structure and function of synchronized clutch assembly 92 utilized in connection with transmission 10. Synchronized clutch assemblies such as assemblies 92 and 128 are well known in the prior art and examples thereof may be seen by reference to U.S. Pat. Nos. 4,462,489; 4,125,179 and 2,667,955, the disclosures of which are incorporated herein by reference.

The detailed structure of the preferred embodiment of auxiliary section 14 is illustrated in FIGS. 1A and 1B, wherein it may be seen that the rearward end of mainshaft 28A extending into the auxiliary transmission section 102 is provided with external splines 130, which mate with internal splines 132 provided on clutch collar 126 for rotationally coupling clutch collar 126 to the mainshaft 28A, while allowing relative axial movement therebetween. The clutch collar 126 is provided with clutch teeth 134 and 136 for selective axial engagement with clutch teeth 138 and 140 provided on gears 118 and 120, respectively. The clutch collar 126 is also provided with a groove 141 for receipt of a shift fork 142.

Gear 118 surrounds mainshaft 28A and is normally free to rotate relative thereto and is axially retained relative to the mainshaft 28A by means of retainers 144. Clutch teeth 136 and 138 present tapered surfaces 146 and 148, which are inclined at about 35° relative to the axis of the mainshaft 28A, which provides an advantageous interaction tending to resist non-synchronous engagement and also tending to cause a synchronous rotation, as is described in greater detail in U.S. Pat. No. 3,265,173, the disclosure of which is incorporated herein by reference. Clutch teeth 136 and 140 are provided with similar complementary tapered surfaces.

Splitter/range gear 120 is rotatably supported at the inward end 150 of output shaft 122 by means of a pair of thrust bearings 152 while range gear 124 surrounds the output shaft 122 and is axially retained thereon by means of thrust washers 154 and 156. Located axially between gears 120 and 124, and rotationally fixed to output shaft 122 by means of external splines 158 and internal splines 160, is the double acting two position synchronized clutch assembly 128. Many of the well known synchronized positive clutch structures are suitable for use in the auxiliary transmission section of the present invention. The synchronized clutch assembly 128 illustrated is of the pin type described in U.S. Pat. No. 4,462,489, the disclosure of which is incorporated herein by reference. Briefly, the synchronized clutch assembly 128 includes a slidable jaw clutch member 162 axially positioned by a shift fork 164 and carrying clutch teeth 166 and 168, respectively, for axial engagement with clutch teeth 170 and 172, respectively, carried by gears 120 and 124, respectively. Gears 120 and 124 define cone friction surfaces 174 and 176, respectively, for frictional synchronizing engagement with matching frictional cone surfaces 178 and 180, respectively, carried by the friction rings 182 and 184, respectively, of the synchronized clutch assembly. Blocker pins 186 and 188 are rotationally fixed to the friction rings 184 and 182, respectively, and interact with blocker openings 190 carried by the sliding member 162 to provide the blocking function, as is well known in the prior art. Synchronizing assembly 128 may also include a plurality of spring pins (not shown) for providing initial engagement of the conical friction surfaces at the initiation of a clutch engagement operation.

Output shaft 122 is supported by bearings 192 in housing H and extends therefrom for attachment of a yolk member Y or the like, which typically forms a portion of a universal joint for driving a propeller shaft PS to a differential of a drive axle DA or the like. The output shaft 122 may also carry a speedometer gear 194 and/or various sealing elements (not shown).

By selectively axially positioning both the splitter clutch 126 and the range clutch 128 in the forward and rearward axial positions thereof, four distinct ratios of main shaft rotation to output shaft rotation may be provided. Accordingly, auxiliary transmission section 102 is a 3-layer auxiliary section of the combined range-and-splitter type providing four selectable speeds or drive ratios between the input (countershaft 28A) and output (output shaft 122) thereof. In compound transmission 10, the main section 12 provides a reverse and five potentially selectable forward speeds. However, one of these selectable forward gear ratios (gear 56) is often a creeper or low gear not intended to be used in the high range. Thus, transmission 100 is properly designated as a (4+1)×(2)×(2) type transmission providing 17 or 18 selectable forward speeds depending upon the desirability and/or practicality of splitting the low or creeper gear.

Figure 2:
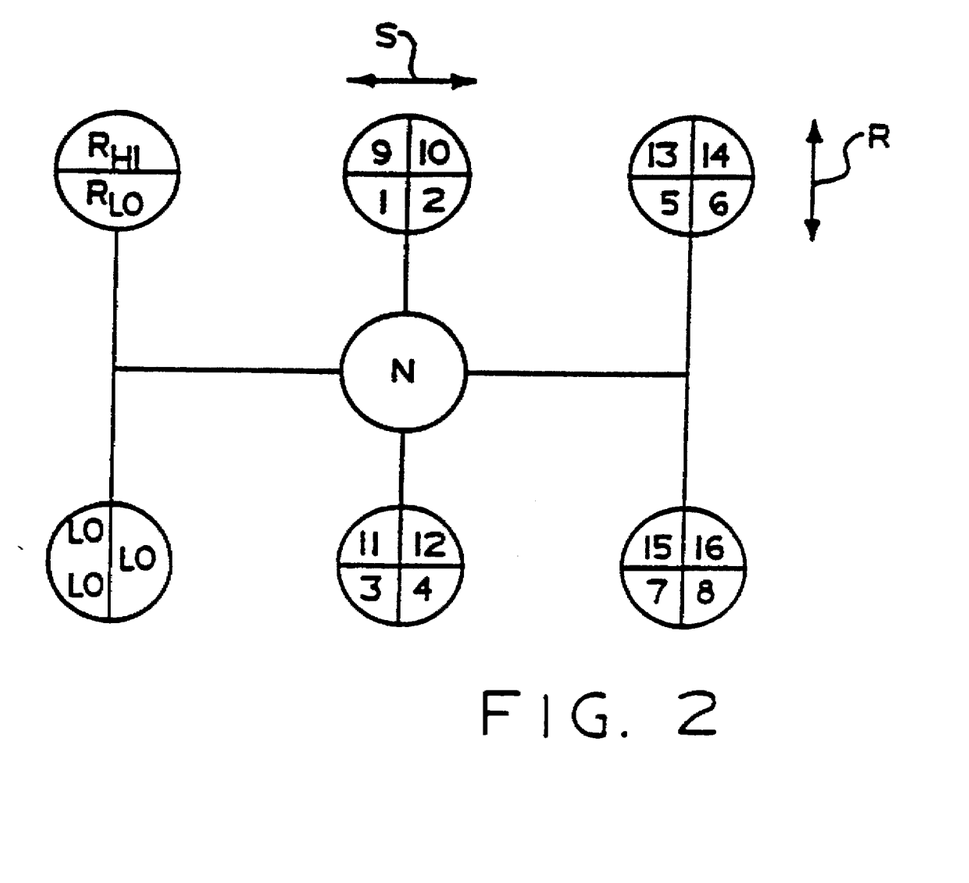
FIG. 2 is a schematic illustration of shift pattern for the transmission of FIG. 1.

While clutch 128, the range clutch, should be a synchronized clutch, double-acting clutch collar 126, the splitter clutch, is not required to be synchronized. Of course, one or both of the clutches defined by collar 126 could be of the synchronized type. The shift pattern for shifting transmission 100 is schematically illustrated in FIG. 2, where divisions in the vertical direction illustrate range shifts, while divisions in the horizontal direction illustrate splitter shifts.

Figure 3:
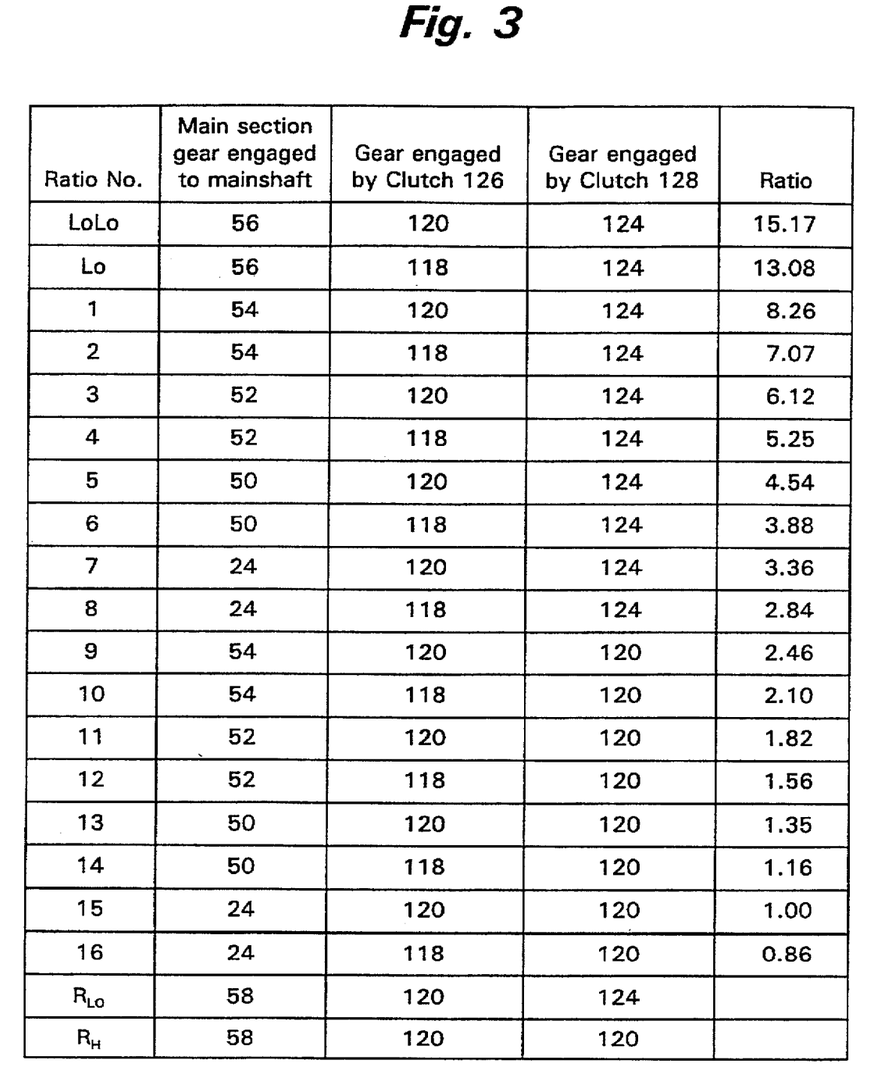
FIG. 3 is a chart illustrating the ratio steps and associated clutch positions for the overdrive transmission of FIG. 1.

FIG. 3 illustrates the various gears engaged for the various selectable forward speeds of transmission 10. FIG. 3 illustrates an auxiliary section wherein the splitter gearing provides a direct and an overdrive ratio. In transmissions wherein the splitter provides an underdrive and a direct ratio, the main section will define the available overdrive ratios, if any. The above example illustrates an "overdrive" type transmission. As is known in the transmission art, a "direct drive" transmission may be provided utilizing the auxiliary transmission section of the present invention by reversing the splitter and splitter/range gear sets and/or reversing the sequence of operation of splitter clutch 126. Such a transmission would, by way of example, provide the same splitter step as discussed above but a somewhat smaller range step. Of course, by modifying the numbers of teeth on the various auxiliary section gears, acceptable range and splitter steps may be provided.

When operating in the direct drive (1:1) ratio (i.e., ratio 15), the clutch 60 connects the mainshaft 28 directly to input shaft 16/input gear 24, the clutch 126 connects the splitter/range gear 120 directly to the mainshaft 28, and the clutch 128 connects the splitter/range gear 120 directly to the output shaft 122. In direct, all torque is transferred from input shaft to mainshaft to output shaft without torque transferred by meshing gear teeth.

In the overdrive ratio, ratio 16, as in the direct drive ratio, clutch 16 connects the mainshaft 28 directly to the input shaft/input gear. In the auxiliary section, clutch 126 connects splitter gear 118 to the mainshaft and clutch 128 connects the splitter/range gear 120 to the output shaft 122. Accordingly, when in the overdrive ratio, auxiliary section torque follows the path of gear 118 to gear 112, gear 112 to auxiliary countershaft 106, auxiliary countershaft 106 to gear 114, gear 114 to gear 120, and gear 120 to output shaft 122. This involves a torque transfer across the meshing gear teeth of gears 118 and 122 and across the meshing gear teeth of gears 114 and 120.

As is known, in change-gear transmissions, the input torque capacity (i.e., the torque which may be applied to the input shaft without damage for the expected life and duty cycle of the transmission) is usually limited by the torque capacity of the individual sets of meshing gears, the torque capacity being defined by the amount of torque that may be transferred by the meshed set or layer of gears over the expected time that set is expected to be engaged without damage (cracking, pitting, etc.) to the teeth.

The torque capacity of spur and helical gearing may be enhanced or increased by using premium materials (i.e., SAE 4817 or SAE 8627 or SAE 9310 steel instead of the SAE 8620 or SAE 4120 or SAE 8622 steel typically utilized for gearing), increasing gear face width FW, utilizing specialized heat treatments, utilizing specialty surface treatments (shot peening, CBN grinding, Fitzer honing, etc.) and/or utilizing specialized coatings (carbon-boron coatings, see U.S. Pat. No. 4,716,083, the disclosure of which is incorporated herein by reference). These techniques, used individually and/or in combination, have limitations and add cost and difficulty to producing the gearing and the transmissions utilizing same. By way of example, as the available axial length of a transmission is a fixed value, increasing the face width of one gear layer will result in a narrowing face width of other gear layers.

Further, even with enhanced-capacity gearing, the expected torque transfer loading in the lower speed ratios may still require limiting the input torque in such lower ratios.

According to the present invention, a powertrain system 100 including an overdrive or direct drive transmission is provided which allows a large-capacity, torque-controlled engine, geared to run slow for low-speed economy, to be utilized at large output torque levels in the direct and other upper ratios.

In the embodiment of FIG. 1, the transmission 10 is modified by enhancing the torque capacity of the overdrive ratios (i.e., gears 118, 112, 114 and 120) by one or more torque capacity enhancing techniques not utilized on all or most of the non-overdrive gears. It is noted that for a direct drive version of transmission 10 (see FIG. 5), the next-to-highest ratio, ratio 15, also utilizes the gears 118, 112, 114 and 120 to transfer torque.

For direct-drive-type transmissions, at least the gearing utilized in the ratio immediately below direct will be enhanced. As used herein, the term "upper ratios" will refer to direct and overdrive ratios for overdrive-type transmissions and direct and the ratio immediately below direct for direct-drive-type transmissions.

Figure 4:
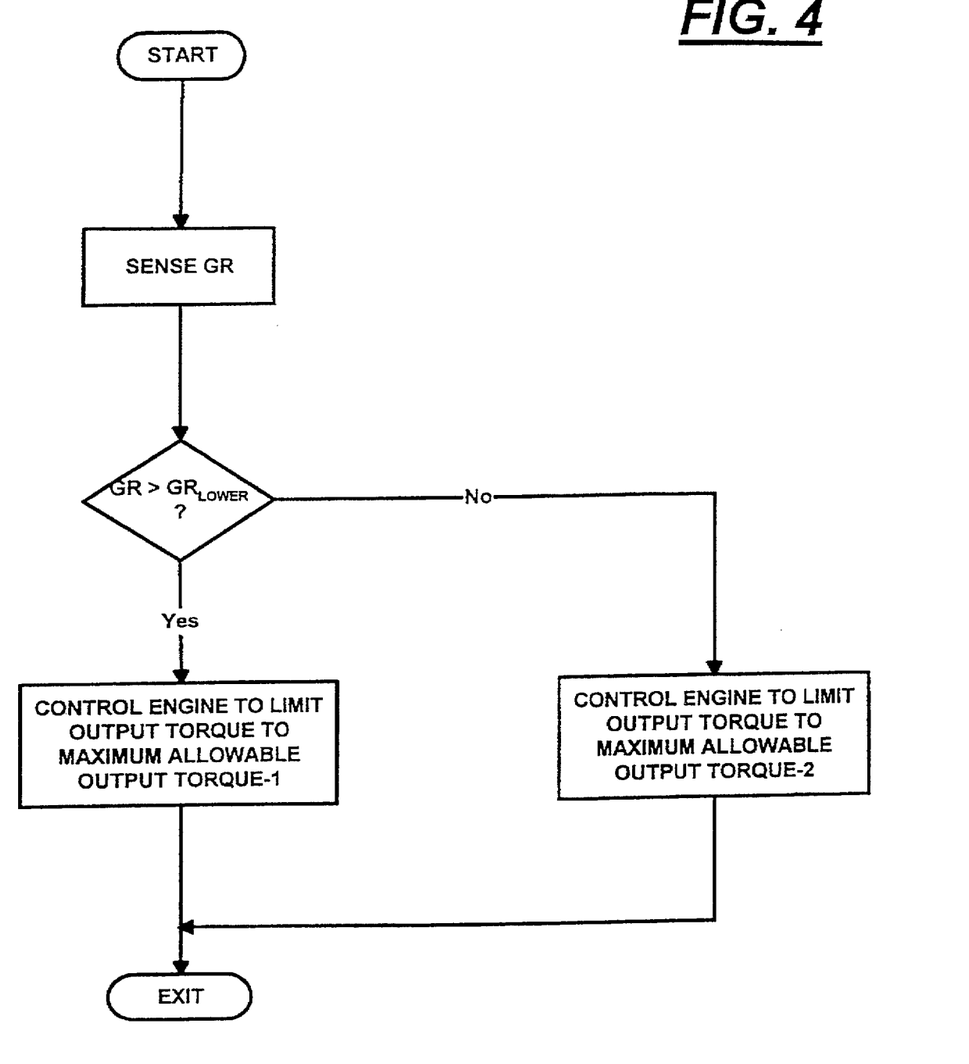
FIG. 4 is a schematic illustration in flow chart format of the method for controlling the powertrain system of FIG. 1.

The powertrain system 100 further includes sensors, such as a sensor 200 for sensing jaw clutch positions or one or more speed sensors 202 and 204, which provide input signals 206 (GR, OS, IS, ES) indicative of the engaged gear ratio to a processing unit 208 which will process same to determine the engaged ratio and will issue command output signals 210 to the engine controller to cause the engine to be controlled such that the maximum engine torque allowed in the upper ratios, MAXIMUM TORQUE-2, will be greater than the maximum engine torque allowed in the lower ratios, MAXIMUM TORQUE-1. The controller 208 may be defined in part by the engine controller EC. FIG. 4 is a flow chart of the operation of system 100.

In simple (non-compound) transmissions and/or range-type compound transmissions, the overdrive ratio gearing and/or the ratio below direct in a direct-drive-type transmission usually will involve the input gear layer and the layer of gears utilizing the largest pitch diameter countershaft gears.

The present invention also is especially useful in a "Top-2" type system wherein the shifting of the upper two or more ratios is controlled automatically, such as by command output signals from an engine controller, while the lower ratios require manual shifting between ratios or groups of ratios. Such transmissions may be seen by reference to aforementioned U.S. Pat. Nos. 4,722,248; 5,038,627 and 5,435,212. By way of example, see FIG. 1, a 2-or-3-position actuator 220 may be provided to operate shift fork 142 for controlling splitter clutch 126. Actuator 220 may be automatically controlled exclusively by the controller 208 or operated by a manual switch or the like in lower ratios.

Although the present invention has been described with a certain degree of particularity, it is understood that the description of the preferred embodiment is by way of example only and that numerous changes to form and detail are possible without departing from the spirit and scope of the invention as hereinafter claimed.

We claim:

1. A multiple-speed, change-gear transmission having an input shaft and an output shaft, said transmission having an upper two ratios and a plurality of lower ratios, said upper two ratios including a direct drive ratio and another upper ratio, said transmission having a first group of meshed gears utilized for transferring torque from said input shaft to said output shaft in said other upper ratio, and a second group of meshed gears not utilized for transferring torque from said input shaft to said output shaft in said other upper ratio, all of the gears in said first group of meshed gears having a torque capacity allowing a greater transmission input torque capacity in said upper two ratios than said lower ratios.

2. The transmission of claim 1 wherein said transmission is a compound transmission of the splitter type, said first group of gears defined by splitter gears only.

3. A multiple-speed, change-gear transmission having an input shaft and an output shaft, said transmission having a plurality of lower ratios, a direct drive ratio and at least one overdrive ratio, said transmission having a first group of meshed gears utilized for transferring torque from said input shaft to said output shaft in said at least one overdrive ratio, and a second group of meshed gears not utilized for transferring torque from said input shaft to said output shaft in any of said at least one overdrive ratio, all of the gears in said first group of meshed gears having a torque capacity allowing a greater transmission input torque capacity in direct and overdrive ratios than in the lower ratios.

4. The transmission of claim 3 wherein said transmission is a compound transmission of the splitter type, said first group of gears defined by splitter gears only.

5. A vehicular powertrain system comprising:

an internal combustion engine;

engine control means for controlling fueling of said engine, said engine control means having at least one mode of operation wherein engine output torque is limited in accordance with engine control command signals;

a multiple-speed, change-gear transmission having an input shaft driven by said engine and an output shaft, said transmission having a plurality of lower ratios and two upper ratios including a direct drive ratio and another upper ratio, said transmission having a first group of meshed gears utilized for transferring torque from said input shaft to said output shaft in said other upper ratio, and a second group of meshed gears not utilized for transferring torque from said input shaft to said output shaft in said other upper ratio, all of the gears in said first group of meshed gears having a torque capacity allowing a greater transmission input torque capacity in said direct and other upper ratios than in lower ratios;

sensing means for providing signals indicative of transmission engaged ratio;

powertrain control means for receiving said input signals and processing same according to predetermined logic rules to issue command output signals, including said engine control command signals, said powertrain control means causing said engine to be limited to a lower maximum torque in said lower ratios than in said direct and overdrive ratios.

6. The powertrain system of claim 5 wherein said engine and powertrain control means are defined by a single microprocessor-based controller.

7. The powertrain system of claim 6 wherein said controller is mounted on said engine.

8. The powertrain system of claim 5 wherein said transmission is a compound transmission of the splitter type, said first group of gears defined by splitter gears only.

9. The powertrain system of claim 5 wherein said engine controller additionally issues command output signals to control automatic shifting between said upper two ratios.

10. The powertrain system of claim 6 wherein said transmission is a compound transmission of the splitter type, said first group of gears defined by splitter gears only.

11. The powertrain system of claim 8 wherein said engine controller additionally issues command output signals to control automatic shifting between said upper two ratios.

12. A vehicular powertrain system comprising:

an internal combustion engine;

engine control means for controlling fueling of said engine, said engine control means having at least one mode of operation wherein engine output torque is limited in accordance with engine control command signals;

a multiple-speed, change-gear transmission having an input shaft driven by said engine and an output shaft, said transmission having a direct drive ratio and at least one overdrive ratio, said transmission having a first group of meshed gears utilized for transferring torque from said input shaft to said output shaft in said at least one overdrive ratio, and a second group of meshed gears not utilized for transferring torque from said input shaft to said output shaft in any overdrive ratio, all of the gears in said first group of meshed gears having a torque capacity allowing a greater transmission input torque capacity in direct and overdrive ratios than in other ratios;

sensing means for providing signals indicative of transmission engaged ratio;

powertrain control means for receiving said input signals and processing same according to predetermined logic rules to issue command output signals, including said engine control command signals, said powertrain control means causing said engine to be limited to a lower maximum torque in ratios below said direct ratio than in said direct and overdrive ratios.

13. The powertrain system of claim 12 wherein said engine and powertrain control means are defined by a single microprocessor-based controller.

14. The powertrain system of claim 13 wherein said controller is mounted on said engine.

15. The powertrain system of claim 12 wherein said transmission is a compound transmission of the splitter type, said first group of gears defined by splitter gears only.

16. The powertrain system of claim 12 wherein said engine controller additionally issues command output signals to control automatic shifting between said direct and overdrive ratios.

17. The powertrain system of claim 15 wherein said engine controller additionally issues command output signals to control automatic shifting between said direct and overdrive ratios.

18. The powertrain system of claim 17 wherein said engine and powertrain control means are defined by a single microprocessor-based controller.

* * * * *